United States Patent
Tomita

(10) Patent No.: US 8,251,775 B2
(45) Date of Patent: Aug. 28, 2012

(54) MECHANISM AND METHOD FOR DETECTING THE MOTION OF A SHAFT

(75) Inventor: Toshikazu Tomita, Tokyo (JP)

(73) Assignee: Applied Materials, Inc., Santa Clara, CA (US)

( * ) Notice: Subject to any disclaimer, the term of this patent is extended or adjusted under 35 U.S.C. 154(b) by 457 days.

(21) Appl. No.: 12/549,270

(22) Filed: Aug. 27, 2009

(65) Prior Publication Data
US 2010/0056030 A1    Mar. 4, 2010

(30) Foreign Application Priority Data

Aug. 29, 2008 (JP) .............................. P2008-221969

(51) Int. Cl.
  *B24B 49/00* (2012.01)
(52) U.S. Cl. .............................. 451/8; 451/56; 451/443
(58) Field of Classification Search ............... 451/8, 41, 451/56, 443, 444
  See application file for complete search history.

(56) References Cited

U.S. PATENT DOCUMENTS

| 4,151,390 A * | 4/1979 | Bisiach ....................... 219/124.1 |
| 4,805,585 A * | 2/1989 | Halvorsen ................... 125/11.01 |
| 4,809,465 A * | 3/1989 | Mushardt et al. ............. 451/342 |
| 6,336,842 B1 * | 1/2002 | Ootsuki et al. ................. 451/21 |
| 6,517,414 B1 * | 2/2003 | Tobin et al. ........................ 451/8 |
| 2001/0006870 A1 * | 7/2001 | Moore .............................. 451/5 |
| 2001/0006871 A1 * | 7/2001 | Moore .............................. 451/5 |
| 2001/0006874 A1 * | 7/2001 | Moore .............................. 451/5 |
| 2008/0070479 A1 * | 3/2008 | Nabeya et al. ..................... 451/8 |
| 2009/0191797 A1 * | 7/2009 | Nabeya et al. ................... 451/54 |

FOREIGN PATENT DOCUMENTS

JP    H9-174420 A    7/1997

OTHER PUBLICATIONS

Notice of Reasons for Rejection from the Japanese Intellectual Property Office dated May 31, 2010, for corresponding Japanese Patent Application No. 2008-221969.

\* cited by examiner

*Primary Examiner* — Maurina Rachuba
(74) *Attorney, Agent, or Firm* — Patterson & Sheridan, LLP

(57) ABSTRACT

A shaft motion detection mechanism capable of detecting the displacement of a rotating body in a direction along a rotational axis and the rotation of the rotating body is disclosed. In one embodiment, the invention is a conditioner head capable of detecting the displacement of a polishing disk in a direction along a rotational axis and the rotation of the polishing disk. A shaft rotates around a rotational axis and a cylindrical shaft is attached to the shaft so that the shaft can be displaced along the rotational axis. A first plurality of projections are formed on the surface of the shaft so as to be aligned in a circumferential direction. A second projection is formed around the entire circumference on the surface of the shaft. Proximity sensors arranged around the rotational axis sense the first and second projections to detect displacement and rotation of the rotating body.

20 Claims, 11 Drawing Sheets

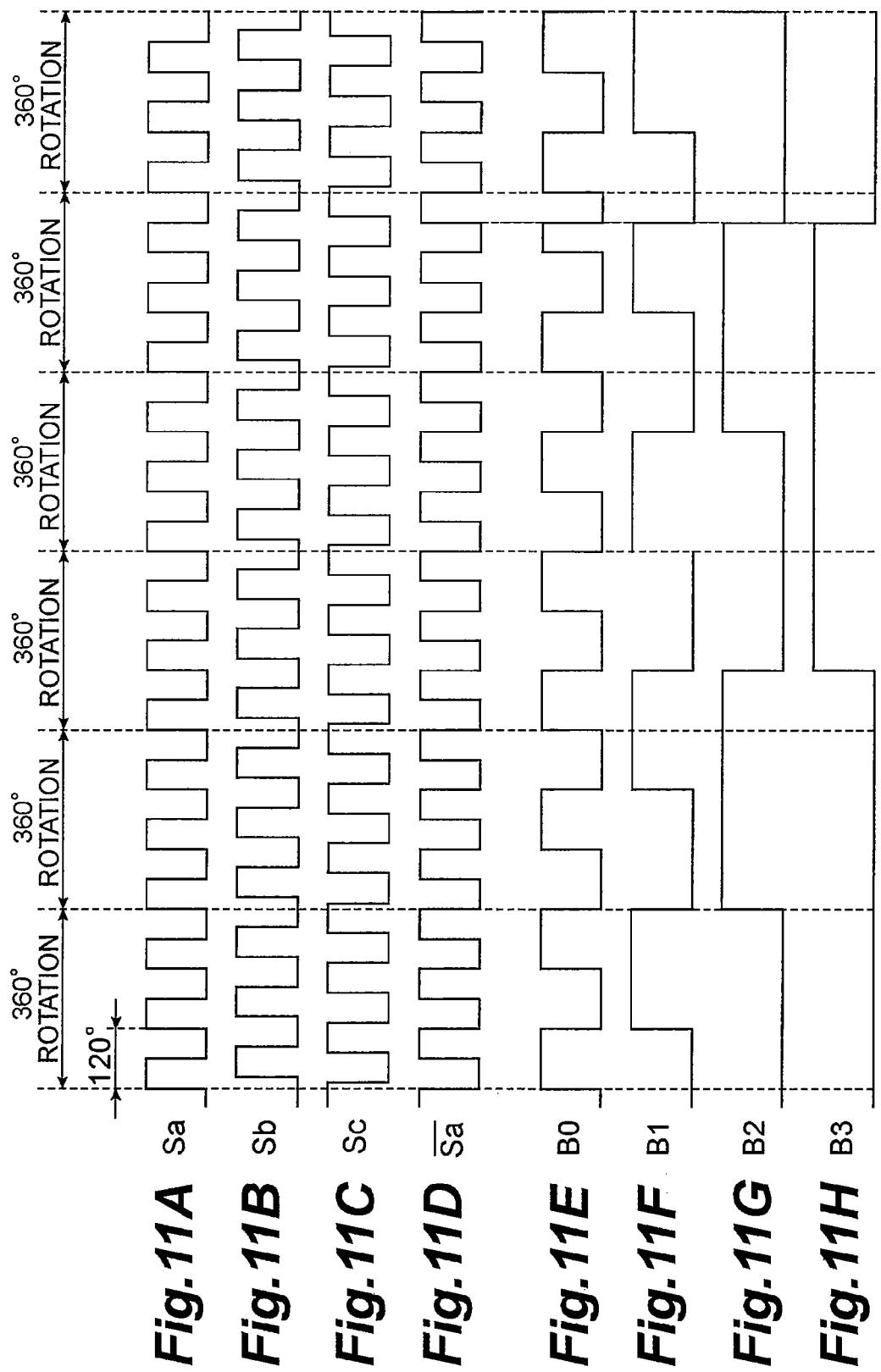

MECHANISM AND METHOD FOR DETECTING THE MOTION OF A SHAFT

BACKGROUND OF THE INVENTION

1. Field of the Invention

The present invention relates to a mechanism and method for detecting the motion of a shaft. More specifically, the invention is a mechanism and method for detecting rotational and axial motion of a shaft, such as a shaft supporting a conditioner head.

2. Related Background Art

Chemical mechanical polishing (CMP) is conventional technology for flattening a surface of a semiconductor wafer such as a silicon wafer. To apply CMP to the surface of a semiconductor wafer, the semiconductor wafer is caused to slide against a polishing pad, while pressing the semiconductor wafer against a polishing surface of the polishing pad and providing a slurry containing a polishing agent and chemical reactant between the polishing pad and the semiconductor wafer.

In addition to the surface of the semiconductor wafer, the polishing surface of the polishing pad can also be flattened by repeated CMP processes. As a result, the surface roughness of the polishing pad decreases, which decreases in the efficiency of the CMP process. For this reason, many CMP devices have a pad conditioner for recovering the surface roughness of the polishing surface of the polishing pad. The pad conditioner restores the surface roughness of the polishing surface by bringing the polishing disk into contact with the polishing pad and rotating the polishing disk. The polishing disk is rotatably supported by a member called the "conditioner head," and the conditioner head moves parallel to the polishing surface on the polishing pad by an arm attached to a CMP device.

Japanese Patent Application Publication No. H9-174420 describes a CMP device that has the pad conditioner mentioned above.

SUMMARY OF THE INVENTION

In a CMP device having the configuration described above, the polishing disk may be rotated by transferring the drive force of a motor embedded in the main body of the CMP device to the conditioner head by means of a rubber belt. In this embodiment, for example, an encoder attached to a motor shaft can be used to detect the rotational speed of the polishing disk. However, when the rubber belt breaks, the breakage of the belt cannot be detected and a semiconductor wafer might be carried to a post-process without being subjected to sufficient polishing. Therefore, it is desired to directly detect whether or not the polishing disk itself is rotating. However, since the polishing disk comes in various forms and is replaced depending on the intended use, it is difficult to directly detect whether or not the polishing disk itself is rotating.

In most embodiments, the conditioner head is provided with a mechanism for lifting the polishing disk up and down in relation to the polishing pad. Such a mechanism allows the conditioner head to bring the polishing disk into contact with the polishing pad or to lift up the polishing disk away from the polishing pad, so that the polishing disk can be moved freely in conjunction with the movement of the arm. In order to control this mechanism, a device for detecting a vertical displacement of the polishing disk (that is, displacement in a direction along a rotational axis of the polishing disk) is required.

As described above, a device having a rotating body such as a polishing disk may be required to include a detector to detect both the vertical displacement and whether or not the polishing disk is rotating. In the prior art, however, the detection was carried out by individually using rotation detection means, such as an encoder, and position detection means, such as a displacement sensor. Previously it was difficult to perform such detection as the encoder cannot be installed in the structure of the rotating body.

The present invention was contrived in view of the problems described above, and an object of the present invention is to provide a mechanism for detecting a shaft motion that is capable of detecting both the displacement of a rotating body in a direction along a rotational axis and the rotation of the rotating body, as well as to provide a conditioner head that is capable of detecting both the displacement of a polishing disk in a direction along a rotational axis and the rotation of the polishing disk.

In order to solve the problems described above, a mechanism for detecting a shaft motion according to the present invention includes: a first shaft that rotates around a predetermined axis; a cylindrical second shaft that rotates around the predetermined axis along with the first shaft and is attached to the first shaft so as to be displaceable along the predetermined axis relative to the first shaft; a frame that rotatably supports the first shaft; a plurality of first projections or a plurality of first recesses that are formed on a surface of the second shaft so as to be aligned in a circumferential direction; a second projection or a second recess that is formed in a position on the surface of the second shaft and extends about the entire circumference thereof, the position being away from the plurality of first projections or the plurality of first recesses in a direction of the predetermined axis; and at least three proximity sensors that are disposed facing the surface of the second shaft and fixed to the frame so as to be aligned around the predetermined axis, wherein an angle formed around the predetermined axis by the proximity sensors that are disposed on both ends out of the at least three proximity sensors is larger than an angle formed around the predetermined axis by a circumferential width of each of the first projections or the first recesses, and an angle formed around the predetermined axis by a space between the plurality of first projections or the plurality of first recesses.

In the mechanism for detecting a shaft motion described above, because the first shaft is rotatably supported by the frame and the second shaft is attached to the first shaft so as to be displaceable along a rotational axis (predetermined axis), the second shaft can be both displaced in the direction along the rotational axis and rotated around the rotational axis. Therefore, for example, when this shaft motion detection mechanism is applied to a conditioner head of a CMP device, the surface roughness of a polishing surface of a polishing pad can be restored by attaching a polishing disk to the second shaft and moving the frame parallel to the polishing surface of the polishing pad.

In the mechanism for detecting a shaft motion described above, the plurality of first projections or the plurality of first recesses are formed on the surface of the second shaft so as to be aligned in a circumferential direction, and at least the three proximity sensors that are arranged around the predetermined axis are fixed to the frame. According to this configuration, each of the proximity sensors detects the first projections or the first recesses every time the second shaft rotates, and therefore the rotation of the first and second shafts can be detected.

Further, in the mechanism for detecting a shaft motion described above, a second projection or a second recess that is formed in a position on the surface of the second shaft extends around the entire circumference thereof, the position being away from the plurality of first projections or the plurality of first recesses in a direction of the predetermined axis. According to this configuration, when the second shaft is displaced to a position where the second projection or the second recess faces the proximity sensors, all of the at least three proximity sensors detect the second projection or the second recess. Therefore, displacement of the second shaft to the position can be detected. In addition, when the second shaft is displaced to a position where the first projections or the first recesses face the proximity sensors, at least one of the at least three proximity sensors does not detect the first projections or the first recesses, but the remaining proximity sensors do detect the first projections or the first recesses. This is because, in the shaft motion detection mechanism described above, the angle formed around the predetermined axis by the proximity sensors that are disposed furthest apart out of the at least three proximity sensors is larger than the angle formed around the predetermined axis by the circumferential width of each of the first projections or the first recesses, as well as the angle formed around the predetermined axis by the space between the plurality of first projections or the plurality of first recesses. Therefore, since it is possible to clearly determine that the proximity sensors detect not the second projection (or the second recess) but the first projections (or the first recesses), displacement of the second shaft to the position described above can be detected.

According to the mechanism for detecting a shaft motion of the present invention, even when an encoder or the like is not attached thereto due to structural restrictions of the rotating body such as the second shaft, both the displacement of the rotating body in the direction along the rotational axis and the rotation of the rotating body can be detected by the first and second projections (or the first and second recesses) provided on the second shaft, as well as by the at least three proximity sensors.

In the mechanism for detecting a shaft motion, the circumferential widths of the plurality of first projections or the plurality of first recesses may be equal to one another, and the plurality of first projections or the plurality of first recesses may be spaced equally. According to this configuration, output signals from the proximity sensors resulting from the rotation of the second shaft become periodic pulse signals. Therefore, the rotation of the second shaft is detected more accurately.

Furthermore, in the mechanism for detecting a shaft motion, three of the first projections or the first recesses may be formed on the surface of the second shaft so as to be aligned in the circumferential direction. The degree of accuracy in detection of rotation drops if the number of first projections or first recesses is small, but if the number of first projections or first recesses is excessively large, the circumferential width of each of the first projections or recesses becomes small, which makes processing complicated. If the number of the first projections or the first recesses is about three, an optimal balance between the accuracy in detection of rotation and ease of the processing is obtained, and rotation of the second shaft can be easily detected. In this case, the angle formed around the predetermined axis by the circumferential width of each of the first projections or the first recesses, and the angle formed around the predetermined axis by the space between the plurality of first projections or the plurality of first recesses is preferably equal to each other, that is, 60°.

Moreover, in the mechanism for detecting a shaft motion, the proximity sensor, which is a proximity sensor disposed between the other of the at least three proximity sensors, may be disposed in a position that divides the angle formed around the predetermined axis by the proximity sensors on the ends, at a rate of 1:2.

A conditioner head according to the present invention is a conditioner head for conditioning a polishing surface of a polishing pad by a polishing disk, the conditioner head comprising: the shaft motion detection mechanism having any of the features described above, wherein the second shaft supports the polishing disk, and the frame moves parallel to the polishing surface of the polishing pad. According to this conditioner head, with any of the shaft motion detection mechanisms described above, both the displacement of the polishing disk in the direction along the rotational axis and the rotation of the polishing disk can be detected by the first and second projections (or the first and second recesses) provided in the second shaft, as well as by at least the three proximity sensors, even when an encoder or the like cannot be installed due to structural limitations of the polishing disk and the second shaft.

The present invention will be more fully understood from the detailed description given hereinbelow and the attached drawings, which are given by way of illustration only and are not to be considered as limiting the present invention.

BRIEF DESCRIPTION OF THE DRAWINGS

FIGS. 11A-11H are timing charts showing various signal waveforms according to embodiments of the invention.

DESCRIPTION OF THE PREFERRED EMBODIMENTS

Embodiments of the shaft motion detection mechanism and the conditioner head according to the present invention will be described hereinafter in detail with reference to the accompanying drawings. It should be noted that the same reference symbols are used to indicate the same elements in the description of the drawings, and therefore the redundant explanations are omitted accordingly.

Figure 1:
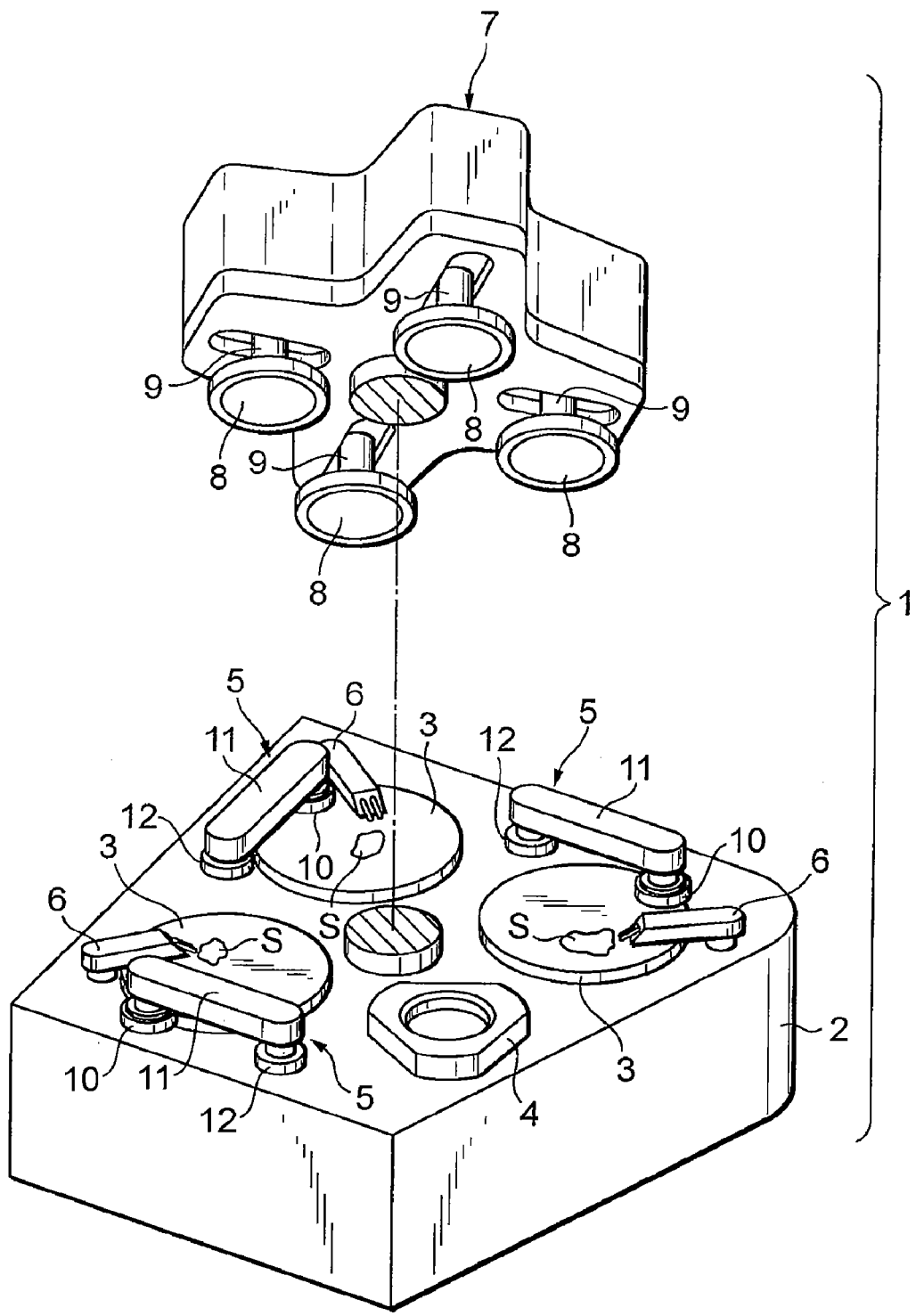
FIG. 1 is a perspective view that schematically shows a CMP device having a shaft motion detection mechanism and a conditioner head according to one embodiment.

FIG. 1 is a perspective view that schematically shows a CMP device 1 having a shaft motion detection mechanism and a conditioner head according to one embodiment. In this figure, the CMP device 1 has a base part 2, and an upper face of the base part 2 is provided with a plurality of (three in this case) polishing pads 3 and one load cup 4. Positioned on the upper face of the base part 2 and adjacent to each of the polishing pads 3 are pad conditioners 5 for adjusting the condition of surfaces of the polishing pads 3 and slurry supply arms 6 for supplying a slurry (polishing agent) S to the surfaces of polishing pads 3.

A head unit 7 is rotatably supported on the upper face of the base part 2. This head unit 7 has a plurality of (four in this case) carrier heads 8 that attract and hold a semiconductor wafer and press the semiconductor wafer against the polishing pads 3, and rotating shafts 9 for rotating the carrier heads 8. Each rotating shaft 9 is rotated by a drive mechanism, which is not shown. A lower face of each carrier head 8 is provided with an elastic film for vacuum-holding the wafer. The elastic film is capable of expanding/contracting by force provided by a supply of air or vacuum provided by a vacuum pump.

Each pad conditioner 5 has a conditioner head 10, an arm 11, and a base 12. One end of the arm 11 is coupled to the conditioner head 10, while the other end of the arm 11 is coupled to the base 12 so that the arm 11 is rotatable. The conditioner head 10 has a polishing disk for restoring (conditioning) the surface roughness of the polishing pad 3. The base 12 is fixed to the vicinity of the polishing pad 3 in the base part 2. The arm 11 moves the conditioner head 10 parallel to the surface (polishing surface) of the polishing pad 3 to remove a contaminated object on the polishing pad 3 and condition the polishing pad 3.

Figure 2:
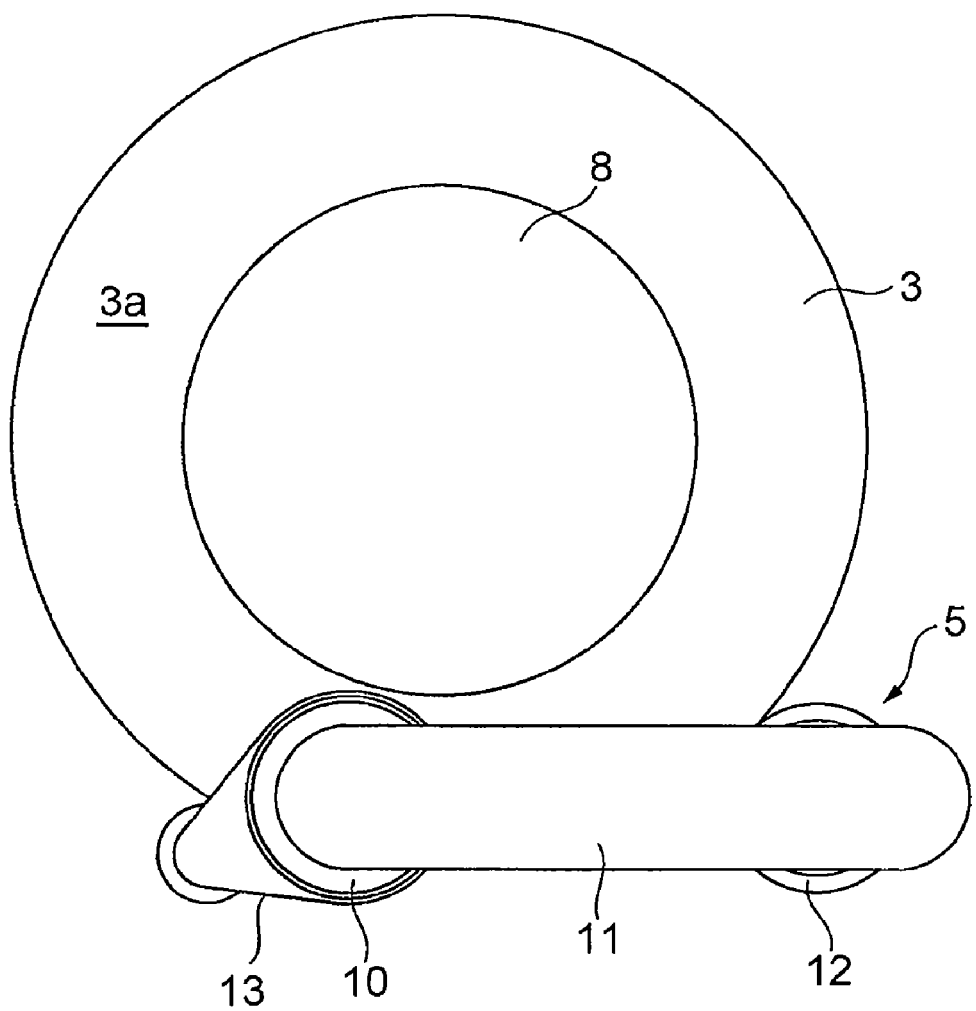
FIG. 2 is a plan view of a pad conditioner according to embodiments of the invention.
Figure 3:
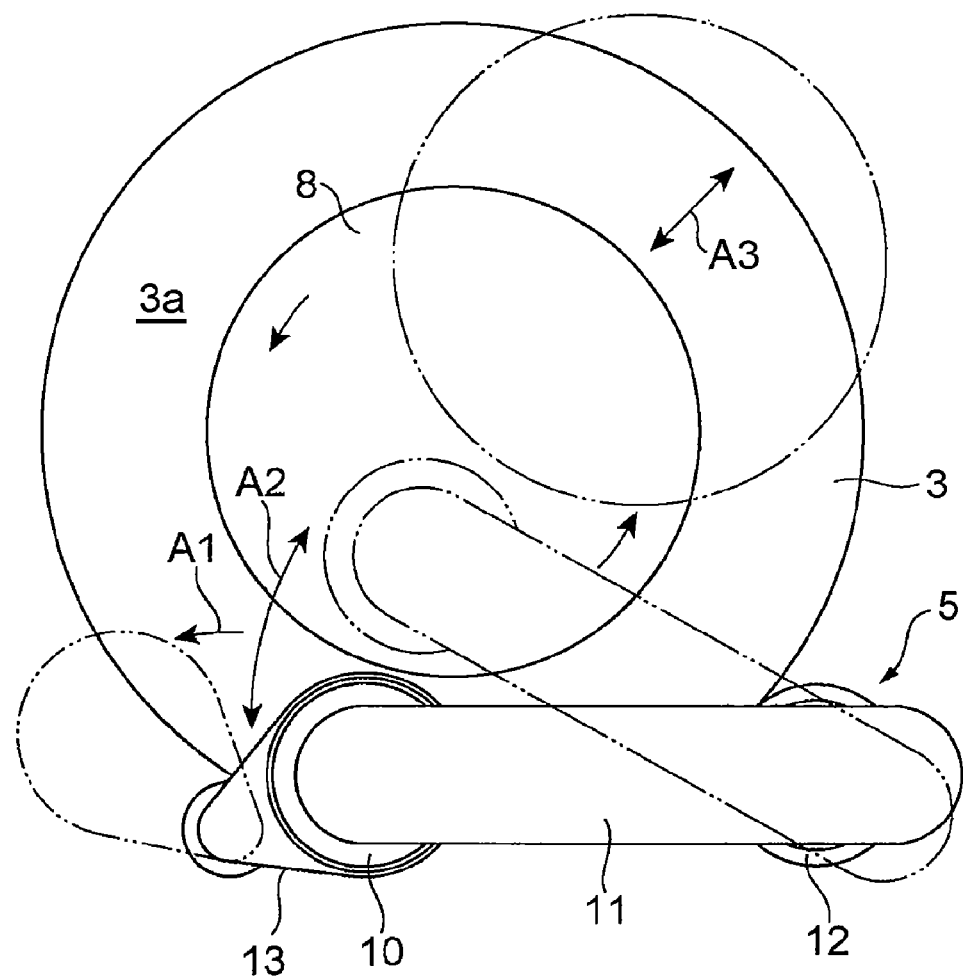
FIG. 3 is a plan view illustrating movement of a pad conditioner according to embodiments of the invention.

FIGS. 2 and 3 are diagrams for illustrating the behavior of each pad conditioner 5 and showing a state in which the pad conditioner 5 is viewed from above. While the polishing pad 3 polishes the semiconductor wafer attached to the carrier head 8, the pad conditioner 5 conditions the polishing pad 3. The conditioner head 10 is swept across the polishing pad 3 by reciprocal movement in synchronization with the movement of the carrier head 8 crossing the polishing pad 3. The pad conditioner 5 has a cup 13 that has cleaning fluid for rinsing or cleaning the polishing disk of the conditioner head 10. While the carrier head 8 is positioned in the center of the polishing pad 3, the conditioner head 10 is immersed with the cleaning fluid contained in the cup 13, as shown in FIG. 2. During polishing, the cup 13 is swirled and diverted in a direction shown by the arrow A1 in FIG. 3, and the conditioner head 10 and the carrier head 8 carrying the semiconductor wafer cross the polishing pad 3 sweep back and forth, as shown by the arrows A2 and A3, respectively.

Figure 4:
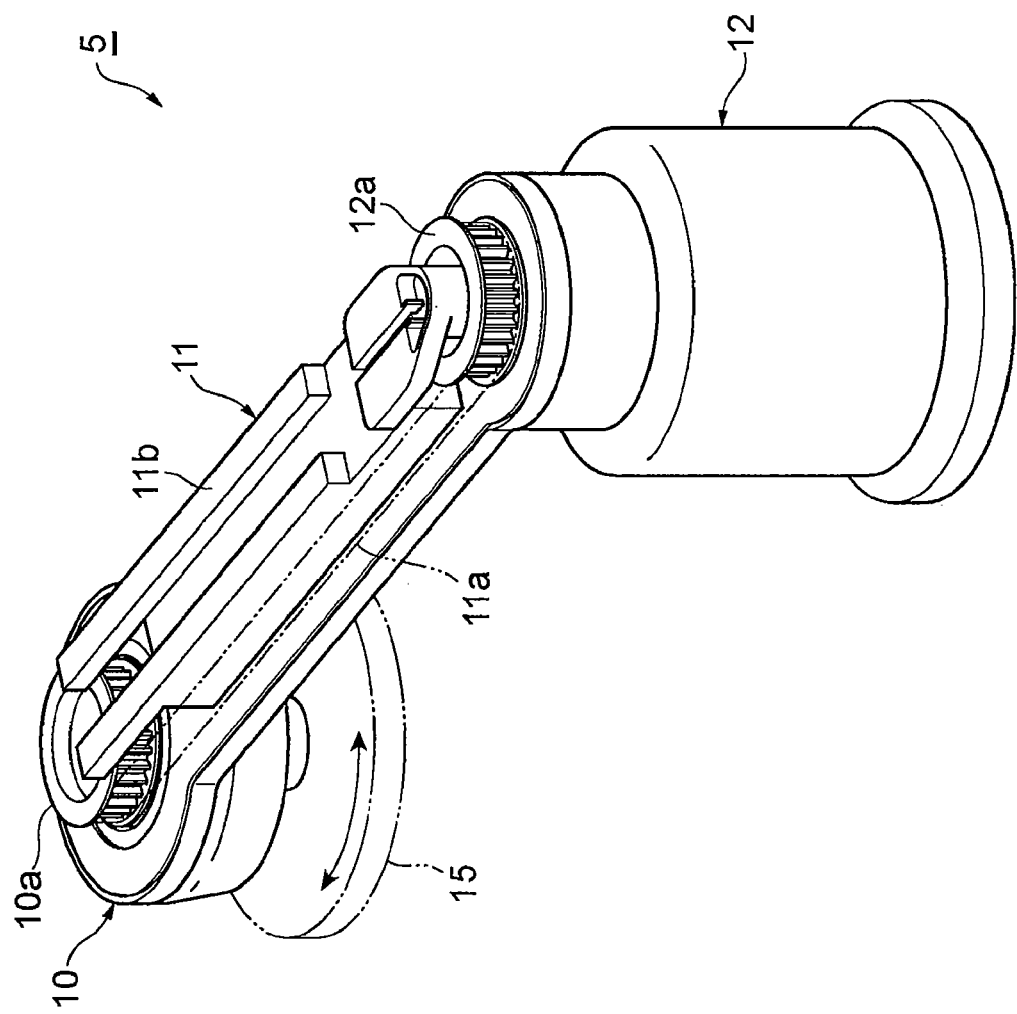
FIG. 4 is an enlarged perspective view showing a conditioner head, arm and base of the pad conditioner of FIG. 2 according to embodiments of the invention.

FIG. 4 is an enlarged perspective view showing the conditioner head 10, arm 11, and base 12 of the pad conditioner 5. It should be noted that, in this diagram, a cover covering the arm 11 is omitted for clarity.

The base 12 has embedded therein a motor that generates a drive force for rotating a polishing disk 15 of the conditioner head 10, and is attached with a pulley 12a connected to a rotating shaft of the motor. The conditioner head 10 is provided with a pulley 10a, and the drive force of the motor in the base 12 is transmitted from the pulley 12a to the pulley 10a via a rubber belt 11a in the arm 11. The arm 11 is provided with a guide member 11b that has a groove for passing a pipe therethrough in a longitudinal direction of the arm 11. The guide member 11b guides a leading end of the pipe extending through the base 12, from the vicinity of the center of the pulley 10a to the inside of the conditioner head 10. This pipe is for routing air pressure for displacing the second shaft of the conditioner head 10, in a direction of the rotational axis as is described hereinafter.

Figure 5:
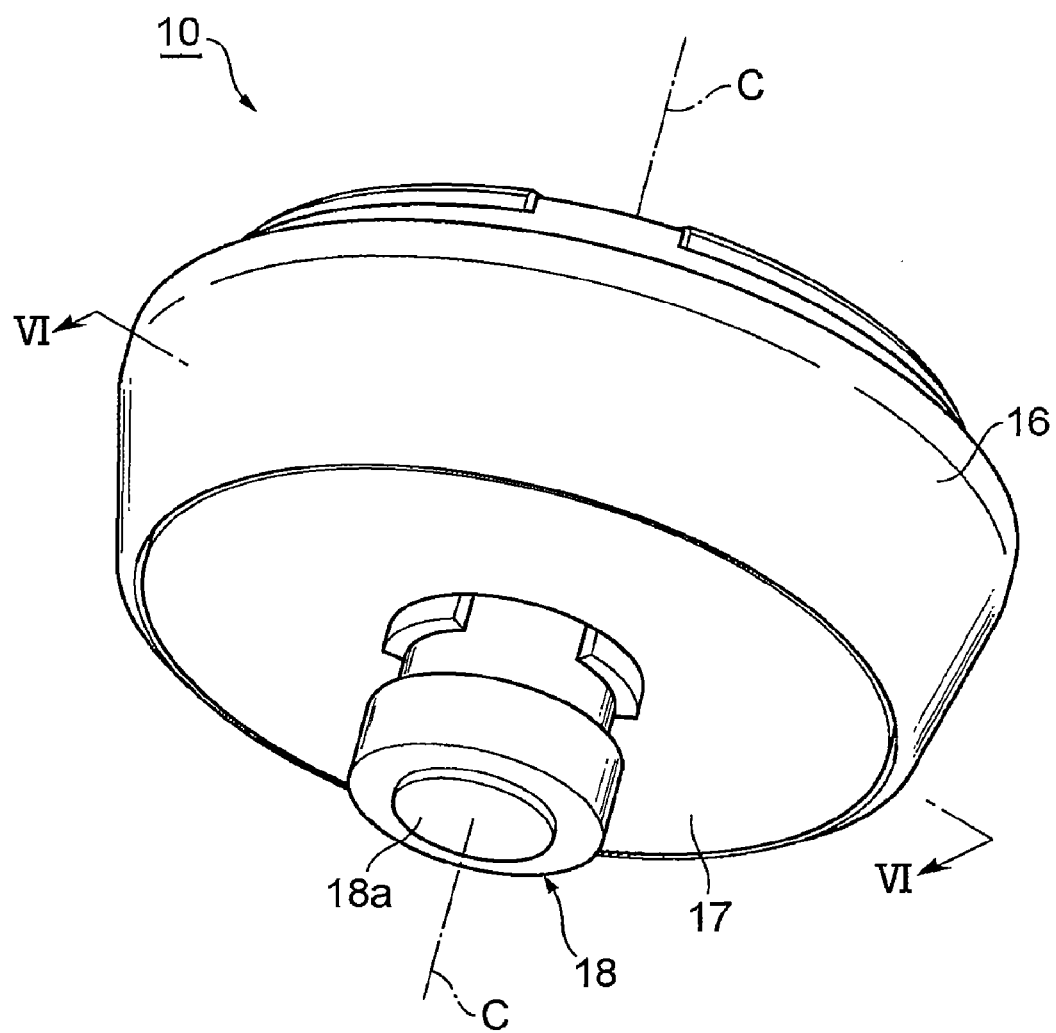
FIG. 5 is a perspective view showing the exterior of the conditioner head according to embodiments of the invention.

FIG. 5 is a perspective view showing the exterior of the conditioner head 10. The conditioner head 10 has substantially a disk-shaped exterior, as shown in FIG. 5, and has a cylindrical frame 16 including a side face of the conditioner head 10 and a circular bottom plate 17 that forms a lower face (end face on a side facing the polishing pad 3) of the same. In a central part of the bottom plate 17, a substantially tubular shaft 18 projects from the bottom plate 17. The shaft 18 is the second shaft of the present embodiment and configures a part of the shaft motion detection mechanism of the present embodiment along with the frame 16. The polishing disk 15 (see FIG. 4) is attached to an end face 18a of the shaft 18. The above-described drive force that is transmitted through the belt 11a and pulley 10a rotates this shaft 18 about a rotational axis C or a predetermined axis, which is perpendicular to the bottom plate 17. In addition, this shaft 18 is supported in the conditioner head 10 so as to be displaceable in a direction along the rotational axis C toward or away from the polishing pad 3.

Figure 6:
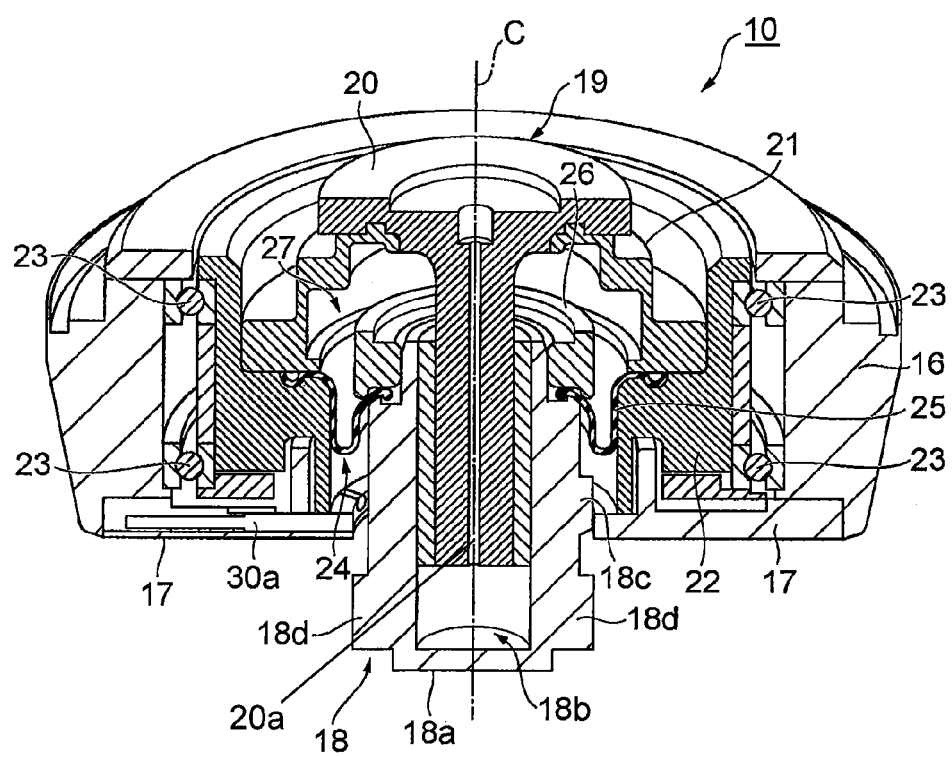
FIG. 6 is a cross-sectional side view taken along section line VI-VI of FIG. 5, showing an internal configuration of the conditioner head according to embodiments of the invention.

FIG. 6 is a cross-sectional side view taken along the line VI-VI of FIG. 5, showing an internal configuration of the conditioner head 10. As shown in FIG. 6, in addition to the frame 16, bottom plate 17 and shaft 18 that are described above, the conditioner head 10 has a shaft 19 that rotates about the rotational axis C as with the shaft 18. The shaft 19 is the first shaft of the present embodiment, and configures a part of the shaft motion detection mechanism of the present invention. The shaft 19 has a drive shaft 20 extending along the rotational axis C, an upper side cylindrical member 21 fixed to an upper end of the drive shaft 20 and supporting the drive shaft 20, and a lower side cylindrical member 22 supporting the upper side cylindrical member 21 from below. The upper side cylindrical member 21 and the lower side cylindrical member 22 surround the drive shaft 20 concentrically, to form a substantially annular space 24 therebetween. The lower side cylindrical member 22 is attached to an inner face of the frame 16 via a bearing 23, whereby the shaft 19 is supported by the frame 16 so as to be rotatable about the rotational axis C. The pulley 10a shown in FIG. 4 is fixed to an upper end of the drive shaft 20, and the shaft 19 is rotated about the rotational axis C by the drive force transmitted through the pulley 10a.

In addition, the shaft 18 supporting the polishing disk 15 (see FIG. 4) has a hollow 18b that is cut out into a cylindrical shape, and is guided into the space 24 such that the drive shaft 20 of the shaft 19 is inserted into the hollow 18b. A through-hole 20a extending along the rotational axis C is formed in the center of the drive shaft 20, and the pipe described above is coupled to an upper end of the through-hole 20a. Air is supplied to and discharged through the pipe.

An elastic diaphragm 25 that has a substantially annular shape defines an upper part of the space 24 to form a pressure chamber 27 between the shaft 18 and the shaft 19. An inner circumferential part of the elastic diaphragm 25 is held and sealed between a nut 26 tightened to one end of the shaft 18, and an outer circumferential part of the elastic diaphragm 25 is held and sealed between the upper side cylindrical member 21 and the lower side cylindrical member 22. The elastic diaphragm 25 extends outwardly from a gap between the nut 26 and the shaft 18, thereafter bends downward in the space 24, and reaches a gap between the upper side cylindrical member 21 and the lower side cylindrical member 22. The pressure within the chamber 27 is adjusted via the through-hole 20a, whereby the shaft 18 is displaced in the direction along the rotational axis C (i.e., vertical direction) relative to the shaft 19.

The shaft 18 is attached to the drive shaft 20 so as to carry out relative displacement in a longitudinal direction between both the shaft 18 and the drive shaft 20 while preventing the shaft 18 from rotating relative to the drive shaft 20. Therefore, when the shaft 19 is rotated by the drive force transmitted through the pulley 10a, the shaft 18 also rotates along with the shaft 19.

Figure 7:
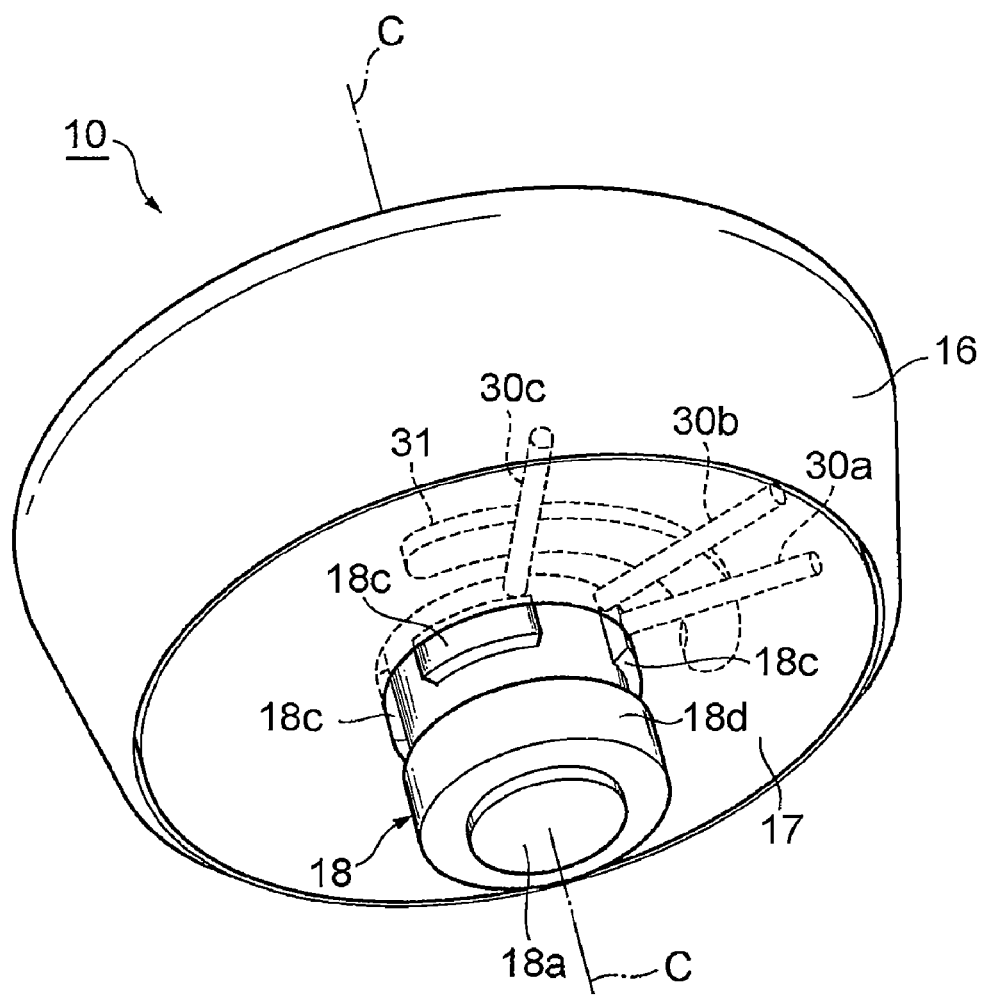
FIG. 7 is a perspective view showing the exterior of a conditioner head having a shaft displaced in a direction along a rotational axis in an extension direction according to embodiments of the invention.
Figure 8:
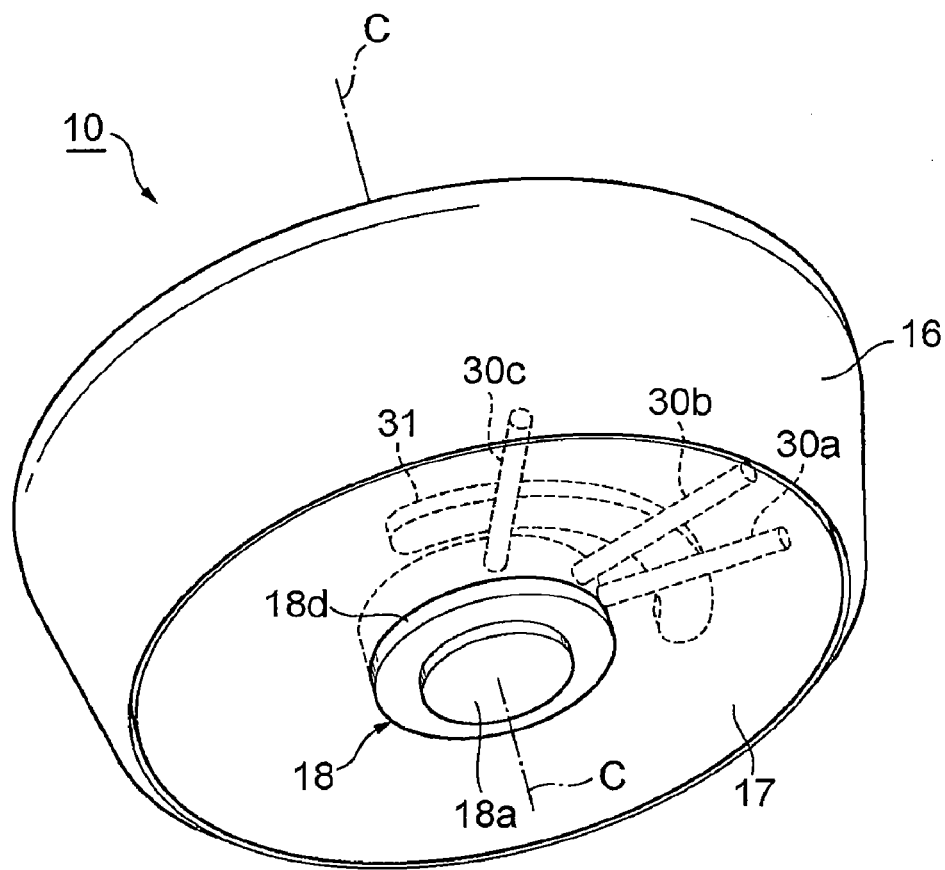
FIG. 8 is a perspective view showing the exterior of a conditioner head having a shaft displaced in a direction along the rotational axis in a contraction direction according to embodiments of the invention.

FIGS. 7 and 8 are perspective views showing how the shaft 18 is displaced in the direction along the rotational axis C. FIG. 7 shows a state in which the shaft 18 is displaced in an extension direction (i.e., a direction in which the chamber 27 shown in FIG. 6 expands), and FIG. 8 shows a state in which the shaft 18 is displaced in a contraction direction (a direction in which the chamber 27 contracts). By allowing the shaft 18 to be displaced in the direction along the rotational axis C in the manner described above, the polishing disk 15 (see FIG. 4) attached to the end face 18a of the shaft 18 can be brought into contact with or separated from the polishing pad 3 (see FIG. 1).

Furthermore, referring to FIGS. 6 and 7, a plurality of projections 18c and one projection 18d are formed on the surface of the shaft 18. The projections 18c correspond to the first projections of the present embodiment, and the projection 18d corresponds to the second projection of the present embodiment. Both projections configure a part of the shaft motion detection mechanism of the present embodiment. As shown in FIG. 7, the plurality of projections 18c extend in a circumferential direction on the surface of the shaft 18 and are arranged in the circumferential direction. The projection 18d is formed in a position away from the projections 18c in the direction along the rotational axis C (specifically, in a direction for approaching the end face 18a) and extends about the entire circumference of the surface of the shaft 18. In other words, the projection 18d makes the diameter of a section near the end face 18a of the shaft 18 wider than the other sections of the shaft 18.

In addition, as shown in FIG. 7, the conditioner head 10 of the present embodiment has three proximity sensors 30a, 30b and 30c. The proximity sensors 30a, 30b and 30c configure a part of the shaft motion detection mechanism of the present embodiment. The proximity sensors 30a, 30b and 30c are arranged around the rotational axis C toward the surface of the shaft 18, and fixed to the frame 16 by the bottom plate 17 (see FIG. 6). The proximity sensors 30a, 30b and 30c sense the surface of the shaft 18 and output different electric signals when the surface of the shaft 18 is relatively close to the proximity sensors 30a, 30b and 30c as opposed to when the surface of the shaft 18 is relatively far from the proximity sensors 30a, 30b and 30c. Specifically, when the projections 18c or the projection 18d are contacting the proximity sensors 30a, 30b or 30c, the corresponding proximity sensor outputs an ON signal (a signal indicating that the surface of the shaft 18 is adjacent to the proximity sensor). When neither the projections 18c nor the projection 18d are contacting the proximity sensor, the corresponding proximity sensor outputs an OFF signal (a signal indicating that the projections 18c or the projection 18d of the shaft 18 is not contacting the proximity sensor).

Figure 9:
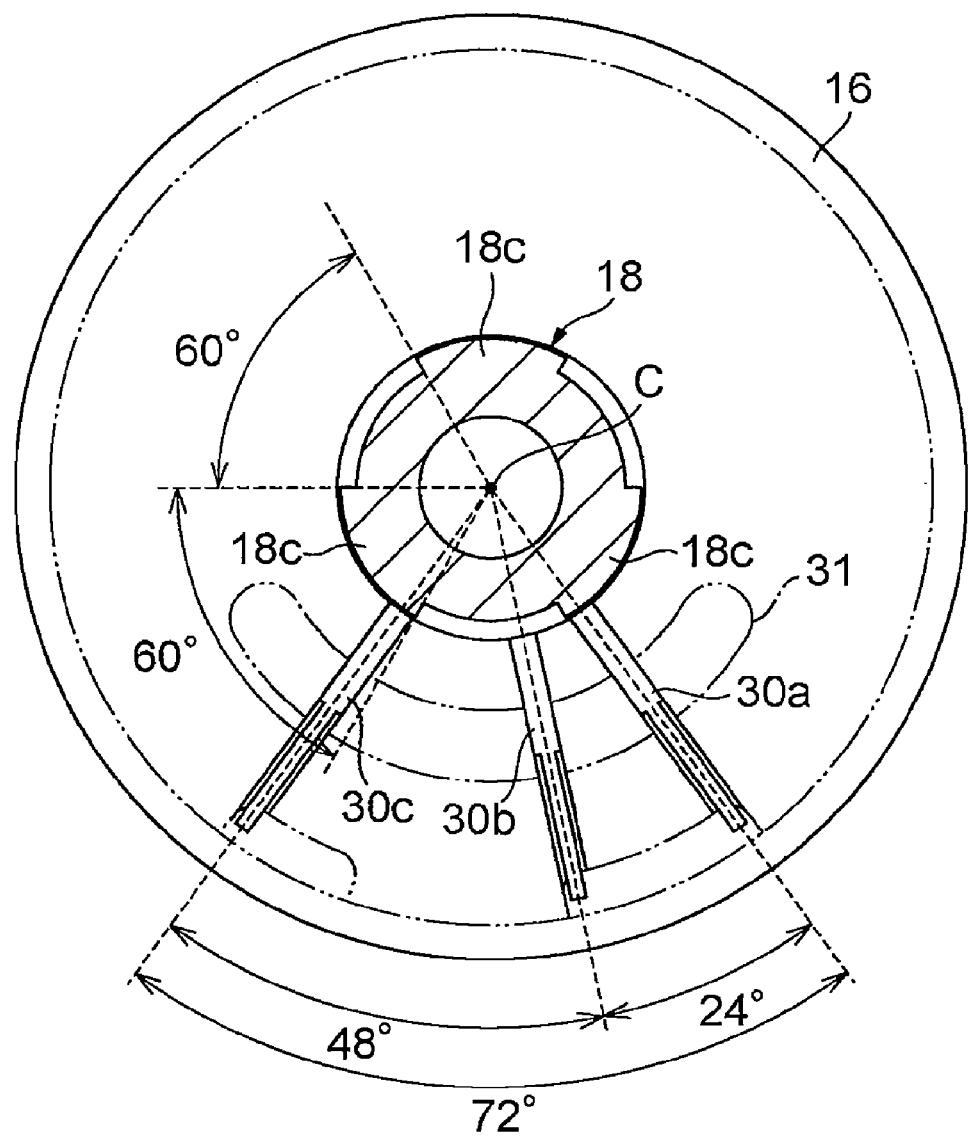
FIG. 9 is a cross-sectional plan view of a shaft having a plurality of projections and an arrangement of proximity sensors according to embodiments of the invention.

FIG. 9 is a diagram showing a plane cross-sectional view of the shaft 18 having the plurality of projections 18c and the arrangement of the proximity sensors 30a, 30b and 30c. In FIG. 9, the hollow 18b formed on the inside of the shaft 18 and the drive shaft 20 inserted into the hollow 18b are omitted.

As shown in FIG. 9, in this embodiment, the angle formed around the rotational axis C by the proximity sensors 30a, 30c that are disposed on both ends (furthest apart) among the three proximity sensors 30a, 30b and 30c, is 72°. It should be noted that the angle formed by the proximity sensors herein means the angle formed by the central axes of the proximity sensors. Furthermore, the angle formed around the rotational axis C by the circumferential width of each of three projections 18c is 60°. The angle formed around the rotational axis C by the space between adjacent projections 18c is also 60° Therefore, in the present embodiment, the angle defined around the rotational axis C by the proximity sensors 30a and 30c is set to be larger than the angle defined around the rotational axis C by the circumferential width of one of the projections 18c and the angle formed around the rotational axis C by the space between the projections 18c.

The proximity sensor 30b located between the proximity sensors 30a and 30c is disposed in a position that divides the angle formed around the rotational axis C by the proximity sensors 30a, 30c disposed on both ends, at a rate of 1:2. More specifically, the angle formed around the rotational axis C between the proximity sensors 30a and 30b is 24° (72°×⅓), and the angle formed around the rotational axis C between the proximity sensors 30b and 30c is 48° (72°×⅔). This positional relationship among the proximity sensors 30a, 30b and 30c is favorably maintained by a substantially arc-shaped supporting plate 31 that is fixed to the frame 16 and supports the proximity sensors 30a, 30b and 30c.

The operation of the shaft motion detection mechanism and the conditioner head of the present embodiment that are configured as described above will now be explained. In the conditioner head 10 with the shaft motion detection mechanism of the present embodiment, since the shaft 19 is rotatably supported by the frame 16 and the shaft 18 is attached so as to be displaceable with respect to the shaft 19 along the rotational axis C, the rotating shaft 18 can not only be displaced in the direction along the rotational axis but also rotated. Therefore, by attaching the polishing disk 15 to the shaft 18 and moving the frame 16 parallel to a polishing surface 3a of the polishing pad 3, the surface roughness of the polishing surface 3a of the polishing pad 3 can be restored favorably.

In the present embodiment, the plurality of projections 18c are formed on the surface of the shaft 18 so as to be aligned in the circumferential direction, and the three proximity sensors 30a, 30b and 30c arranged around the rotational axis C are fixed to the frame 16. According to this configuration, each of the proximity sensors 30a, 30b and 30c can detect the projections 18c every time the shaft 18 rotates, and therefore the rotation of the shaft bodies 18 and 19 is detected favorably.

Figure 10:
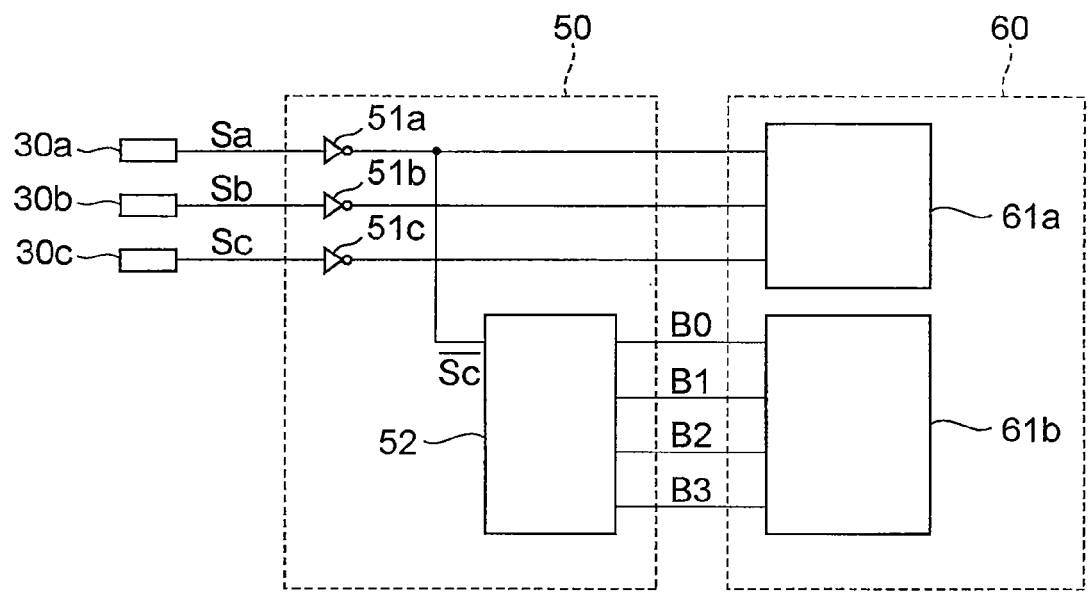
FIG. 10 is a circuit diagram showing an example of a circuit for determining rotation angles of shafts using output signals from the proximity sensors according to embodiments of the invention.

A circuit that is suitable for detecting the rotation of the shaft bodies 18 and 19 is now described. A circuit 50 shown in FIG. 10 is a circuit for obtaining rotation angles of the shaft bodies 18 and 19 from the output signals of the proximity sensors 30a, 30b and 30c. The circuit 50 has three NOT circuits 51a, 51b and 51c that receive signals Sa to Sc from the proximity sensors 30a to 30c respectively, and a 4-bit binary counter 52 receives an inversion signal of the signal Sa from the output of the NOT circuit 51a. The four output signals that are output from the NOT circuits 51a, 51b and 51c are provided to a main computer 60, for example, to a digital input/output module 61a. Furthermore, 4-bit output signals B0 to B3 that are output from the 4-bit binary counter 52 are provided to the main computer 60, for example, to a digital input/output module 61b.

FIGS. 11A to 11H are timing charts showing an example of signal waveforms of the output signals Sa to Sc that are output from the proximity sensors 30a to 30c, of the inversion signal that is output from the output signal Sa, and of the 4-bit output signals B0 to B3 that are output from the 4-bit binary counter 52. As shown in FIGS. 11A to 11C, the pulse interval in the output signals Sa to Sc indicates the rotation by 120°. The 4-bit binary counter 52 inputs the inversion signal of the output signal Sa to generate a bit B0 at which the pulse interval is 240°, a bit B1 at which the pulse interval is 480°, a bit B2 at which the pulse interval is 960°, and a bit B3 at which the pulse interval is 1920° as shown in FIGS. 11E to 11H. As a result, the 4-bit binary counter 52 can output signals that indicate the absolute angles of about five rotations.

Moreover, in the present embodiment, the projection 18d that is separated in the direction of the rotational axis C relative to the plurality of projections 18c is provided throughout the entire circumference on the surface of the shaft 18. In this configuration, when the shaft 18 is displaced to a position where the projection 18d faces the proximity sensors 30a, 30b and 30c, as shown in FIG. 8, all of the three proximity sensors 30a, 30b and 30c detect the projection 18d. In other words, all of the output signals Sa to Sc that are output from the proximity sensors 30a, 30b and 30c shown in FIG. 11 are turned ON. Therefore, displacement of the shaft 18 to this position can be detected favorably.

When the shaft 18 is displaced to a position where the plurality of projections 18c face the proximity sensors 30a, 30b and 30c as shown in FIG. 7, at least one of the three proximity sensors 30a, 30b or 30c does not detect the projections 18c, but the rest of the proximity sensors do detect the projections 18c. This is because the angle formed around the rotational axis C by the proximity sensors 30a and 30c that are disposed as the outer of the three proximity sensors 30a to 30c (72° apart in the present embodiment) is larger than the angle formed around the rotational axis C by the circumferential width of each of the projections 18c (60° in the present embodiment), as well as the angle formed around the rotational axis C by the space between the projections 18c (60° in the present embodiment). This configuration is illustrated in FIG. 9. In the state shown in FIG. 9, the proximity sensors 30a and 30c detect the projections 18c. On the other hand, the proximity sensor 30b does not face the projections 18c and therefore does not detect the projections 18c. Thereafter, when the shaft 18 rotates clockwise on as seen in FIG. 9 and the proximity sensor 30b detects the projections 18c, the proximity sensor 30c no longer faces the projections 18c and therefore no longer detects the projections 18c. In addition, when the proximity sensors 30b and 30c detect the projections 18c, the proximity sensor 30a no longer detects the projections 18c. Therefore, when the shaft 18 is displaced to the position shown in FIG. 7, it is possible to clearly determine that the proximity sensors 30a, 30b and 30c are not detecting the projection 18d but the individual projections 18c. Thus, displacement of the shaft 18 to this position can be detected.

As described above, according to the shaft motion detection mechanism of the present embodiment and the conditioner head 10 having this mechanism, even when an encoder or the like cannot be installed due to the structural limitations of the rotating body such as the shaft 18 and the polishing disk 15, both the displacement of the rotating body in the direction along the rotational axis C and the rotation of the rotating body can be detected by use of the projections 18c and projection 18d provided on the shaft 18 and the three proximity sensors 30a, 30b and 30c.

In the present embodiment, it is preferred that the circumferential widths of the plurality of projections 18c be equal to one another and that the plurality of projections 18c be spaced equally. The output signals Sa to Sc that are output from the proximity sensors 30a to 30c as a result of the rotation of the shaft 18 therefore become periodic signals as shown in FIGS. 11A to 11C, and therefore whether the shaft 18 is rotating or not rotating can be detected more accurately.

As in the present embodiment, it is preferred that three projections 18c be formed on the surface of the shaft 18 so as to be aligned in the circumferential direction. The degree of accuracy in detection of rotation drops if the number of projections 18c is small, but if the number of projections 18c is excessively large, the circumferential width of each projection becomes small, making processing more complicated. About three projections 18c can achieve an optimal balance between the accuracy in detection of rotation and ease of the processing, and whether the shaft 18 is rotated or not can be detected favorably. In this case, the angle formed around the rotational axis C by the circumferential width of each of the projections 18c, and the angle formed around the rotational axis C by the space between the plurality of projections 18c are preferably equal to each other, that is, 60°.

In addition, as in the present embodiment, the proximity sensor 30b out of the three proximity sensors 30a to 30c is preferably disposed in a position that divides the angle formed around the rotational axis C by the proximity sensors 30a and 30c, at a rate of 1:2. However, even when this rate is not used, the effects of the present embodiment can be obtained as long as the proximity sensor 30b is disposed between the proximity sensors 30a and 30c.

The shaft motion detection mechanism of the present embodiment uses the proximity sensors 30a, 30b and 30c to detect rotation and displacement of the shaft 18 by utilizing the recesses or projections on the surface of the shaft 18. In addition to the method described above a further embodiment of a method for detecting rotation and displacement of the shaft 18 may include arranging reflective surfaces on the surface of the shaft 18, in place of the projections 18c and 18d, and irradiating the shaft 18 with light to detect reflected light from the reflective surfaces. However, in the conditioner head 10 of the CMP device 1, the slurry often adheres to the surface of the shaft 18, and therefore it is difficult to stably detect the rotation and displacement of the shaft 18 by means of the method utilizing light. As in the shaft motion detection mechanism of the present embodiment, with the use of the method for detecting the recesses or projections of the surface of the shaft 18 by means of the proximity sensors, the recesses or projections can be detected without problems, even when the slurry adheres to the surface of the shaft 18.

The shaft motion detection mechanism and the conditioner head according to the present invention are not limited to the embodiments described above, and various modifications can be made thereto. For example, the embodiments above have been described as a shaft motion detection mechanism of the present invention is applied to the conditioner head of a CMP device, but the shaft motion detection mechanism of the present invention can be used for various other purposes.

In addition, while the embodiments above have been described as including the first projections (projections 18c) and the second projection (projection 18d) formed on the surface of the second shaft (shaft 18), the technical idea of the present invention will achieve the same effects as the embodiments described above, even when first recesses are used in place of the first projections, or a second recess is used in place of the second projection. In other words, even when the plurality of first recesses are arranged in the circumferential direction and the second recess is formed in a position away from the plurality of first recesses in a direction of the predetermined axis, and extending about the entire circumference on the surface of the second shaft, and even when the angle formed around the predetermined axis by the proximity sensors disposed on both ends out of the three proximity sensors is set to be larger than the angle formed around the predetermined axis by the circumferential width of each of the first recesses and the angle formed around the predetermined axis by the space between the plurality of first recesses, the effects that are achieved are the same as the effects described in the above embodiments using projections as opposed to recesses.

The above embodiments have described as one that the shaft motion detection mechanism has the three proximity sensors 30a, 30b and 30c, but the effects described above can be obtained favorably as long as the shaft motion detection mechanism according to the present embodiment has three or more proximity sensors. In addition, the above embodiments have described as one that the circumferential widths of the projections 18c are equal to one another and the projections 18c are spaced equally, but the effects of the present invention can be attained even when these widths and spaces are different. Moreover, these widths and spaces are not limited to those described in the embodiments. With regard to the number of first projections, even when, for example, at least two or four first projections are arranged, the effects of the present invention can be attained favorably.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A mechanism for detecting a shaft motion, comprising:
   a first shaft that rotates around a predetermined axis;
   a cylindrical second shaft that rotates around the predetermined axis along with the first shaft and is attached to the first shaft so as to be displaceable along the predetermined axis relative to the first shaft;
   a frame that rotatably supports the first shaft;
   a plurality of first projections or recesses that are formed on a surface of the second shaft so as to be aligned in a circumferential direction;
   a second projection or recess that is formed in a position on the surface of the second shaft and extends about the entire circumference thereof, the position being away from the plurality of first projections or recesses in a direction of the predetermined axis; and
   at least three proximity sensors that are disposed facing the surface of the second shaft and fixed to the frame so as to be aligned around the predetermined axis;
   wherein the at least three proximity sensors sense the plurality of first projections or recesses and the second projection or recess to detect a motion of the second shaft.

2. The mechanism according to claim 1, wherein the circumferential widths of the plurality of first projections or recesses are equal to one another, and the plurality of first projections or recesses are spaced equally from one another about the circumference of the second shaft.

3. The mechanism according to claim 1, wherein the plurality of first projections or recesses comprises three first projections or recesses formed on the surface of the second shaft so as to be aligned in the circumferential direction.

4. The mechanism according to claim 3, wherein an angle formed around the predetermined axis by a circumferential width of each of the first projections or recesses, and an angle formed around the predetermined axis by a space between the plurality of first projections or recesses are 60°, respectively.

5. The mechanism according to claim 1, wherein one of the at least three proximity sensors, which is located between two proximity sensors that are disposed furthest apart of the at least three proximity sensors, is disposed in a position that divides an angle formed around the predetermined axis by the two proximity sensors that are disposed furthest apart, at a rate of 1:2.

6. A conditioner head for conditioning a polishing surface of a polishing pad by means of a polishing disk, the conditioner head comprising:
   a mechanism for detecting a shaft motion, comprising:
      a first shaft that rotates around a predetermined axis;
      a cylindrical second shaft that rotates around the predetermined axis along with the first shaft and is attached to the first shaft so as to be displaceable along the predetermined axis relative to the first shaft, the second shaft supporting the polishing disk;
      a frame that rotatably supports the first shaft;
      a plurality of first projections or recesses that are formed on a surface of the second shaft so as to be aligned in a circumferential direction;
      a second projection or recess that is formed in a position on the surface of the second shaft and extends about the entire circumference thereof, the position being away from the plurality of first projections or recesses in a direction of the predetermined axis; and
      at least three proximity sensors that are disposed facing the surface of the second shaft and fixed to the frame so as to be aligned around the predetermined axis;
   wherein the at least three proximity sensors sense the plurality of first projections or recesses and the second projection or recess to detect a motion of the second shaft, and
   the frame moves parallel to the polishing surface of the polishing pad.

7. The conditioner head according to claim 6, wherein circumferential widths of the plurality of first projections or recesses are equal to one another, and the plurality of first projections or recesses are spaced equally from one another about the circumference of the second shaft.

8. The conditioner head according to claim 6, wherein the plurality of first projections or recesses comprises three first projections or recesses formed on the surface of the second shaft so as to be aligned in the circumferential direction.

9. The conditioner head according to claim 8, wherein an angle formed around the predetermined axis by a circumferential width of each of the first projections or recesses, and an angle formed around the predetermined axis by a space between the plurality of first projections or recesses are 60°, respectively.

10. The conditioner head according to claim 6, wherein one of the at least three proximity sensors, which is located between two proximity sensors that are disposed furthest apart of the at least three proximity sensors, is disposed in a position that divides an angle formed around the predetermined axis by the two proximity sensors that are disposed furthest apart, at a rate of 1:2.

11. The conditioner head according to claim 10, wherein the angle formed around the predetermined axis by the two proximity sensors that are disposed furthest apart of the at least three proximity sensors is larger than an angle formed around the predetermined axis by a circumferential width of each of the first projections or recesses, and an angle formed around the predetermined axis by a space between the plurality of first projections or recesses.

12. The conditioner head according to claim 6, wherein the motion detected is displacement of the second shaft in the direction of the predetermined axis.

13. The conditioner head according to claim 6, wherein the motion detected is rotation of the second shaft about the predetermined axis.

14. The conditioner head according to claim 6, wherein the motion detected is displacement of the second shaft in the direction of the predetermined axis and rotation of the second shaft about the predetermined axis.

15. The mechanism according to claim 5, wherein the angle formed around the predetermined axis by the two proximity sensors that are disposed furthest apart of the at least three proximity sensors is larger than an angle formed around the predetermined axis by a circumferential width of each of the first projections or recesses, and an angle formed around the predetermined axis by a space between the plurality of first projections or recesses.

16. The mechanism according to claim 1, wherein the motion detected is displacement of the second shaft in the direction of the predetermined axis.

17. The mechanism according to claim 1, wherein the motion detected is rotation of the second shaft about the predetermined axis.

18. The mechanism according to claim 1, wherein the motion detected is displacement of the second shaft in the direction of the predetermined axis and rotation of the second shaft about the predetermined axis.

19. A method for detecting a shaft motion, comprising:
providing a first shaft that rotates around a predetermined axis;
providing a cylindrical second shaft that rotates around the predetermined axis along with the first shaft and is attached to the first shaft so as to be displaceable along the predetermined axis relative to the first shaft;
providing a frame that rotatably supports the first shaft;
providing a plurality of first projections or recesses that are formed on a surface of the second shaft so as to be aligned in a circumferential direction;
providing a second projection or recess that is formed in a position on the surface of the second shaft and extends about the entire circumference thereof, the position being away from the plurality of first projections or recesses in a direction of the predetermined axis;
providing at least three proximity sensors that are disposed facing the surface of the second shaft and fixed to the frame so as to be aligned around the predetermined axis; and
sensing the plurality of first projections or recesses and the second projection or recess using the at least three proximity sensors, to detect a motion of the second shaft.

20. The method according to claim 19, wherein the motion detected is displacement of the second shaft in the direction of the predetermined axis and rotation of the second shaft about the predetermined axis.

* * * * *